(12) United States Patent
Mjelde

(10) Patent No.: US 11,311,828 B1
(45) Date of Patent: *Apr. 26, 2022

(54) PIPELINE FILTER

(71) Applicant: AquaStar Pool Products, Inc., Ventura, CA (US)

(72) Inventor: Olaf Mjelde, Ventura, CA (US)

(73) Assignee: AQUASTAR POOL PRODUCTS, INC., Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,146

(22) Filed: Jun. 17, 2021

Related U.S. Application Data

(63) Continuation of application No. 17/154,527, filed on Jan. 21, 2021, now Pat. No. 11,154,801, which is a continuation of application No. 17/007,595, filed on Aug. 31, 2020, now Pat. No. 11,014,027, which is a continuation of application No. 16/864,382, filed on May 1, 2020, now Pat. No. 10,792,596.

(60) Provisional application No. 62/854,856, filed on May 30, 2019.

(51) Int. Cl.
*B01D 35/30* (2006.01)
*B01D 29/15* (2006.01)
*B01D 29/21* (2006.01)
*B01D 36/00* (2006.01)

(52) U.S. Cl.
CPC .............. *B01D 35/30* (2013.01); *B01D 29/15* (2013.01); *B01D 29/21* (2013.01); *B01D 35/303* (2013.01); *B01D 36/001* (2013.01); *B01D 2201/301* (2013.01); *B01D 2201/302* (2013.01); *B01D 2201/305* (2013.01); *B01D 2201/306* (2013.01); *B01D 2201/34* (2013.01); *B01D 2201/4023* (2013.01); *B01D 2201/4038* (2013.01); *B01D 2201/4076* (2013.01)

(58) Field of Classification Search
CPC ........ B01D 2201/301; B01D 2201/302; B01D 2201/305; B01D 2201/306; B01D 2201/34; B01D 2201/4023; B01D 2201/4038; B01D 2201/4076; B01D 29/15; B01D 29/21; B01D 35/30; B01D 35/303; B01D 36/001
See application file for complete search history.

(56) References Cited

U.S. PATENT DOCUMENTS

| | | |
|---|---|---|
| 5,947,462 A | 9/1999 | Roussel |
| 6,217,754 B1 | 4/2001 | Ros |
| 6,221,321 B1 | 4/2001 | Fleischer et al. |
| 6,402,798 B1 | 6/2002 | Kallsen et al. |

(Continued)

*Primary Examiner* — Terry K Cecil
(74) *Attorney, Agent, or Firm* — Cislo & Thomas, LLP

(57) ABSTRACT

A pipeline filter assembly comprising a base assembly, an outer wall, and a lid assembly. The outer wall has a lower end portion and an upper end portion, wherein the upper end portion comprises a lower collar, and the lower collar comprises at least one lock notch spaced around an exterior surface thereof. The lid assembly is configured to couple to the lower collar of the outer wall. The lid assembly has an upper collar configured to threadedly mate with the lower collar. The upper collar has at least one housing that projects from the upper collar, the housing having an interior surface, and at least one biasing clip pivotally mounted within the housing for releasable engagement with the lock notch. A pair of pipeline filter assemblies, wherein at least one connection plate is used.

15 Claims, 10 Drawing Sheets

(56) References Cited

U.S. PATENT DOCUMENTS

| | | |
|---|---|---|
| 7,976,603 B2 | 7/2011 | Bauder et al. |
| 8,557,950 B2 | 10/2013 | Jernigan |
| 8,839,976 B2 * | 9/2014 | Morris, Jr. ........... B65D 50/046 220/288 |
| 9,492,768 B2 | 11/2016 | Fick et al. |
| 10,792,596 B1 | 10/2020 | Mjelde |
| 2007/0187306 A1 | 8/2007 | Pecca |
| 2010/0126946 A1 | 5/2010 | Morgan |
| 2014/0217003 A1 | 8/2014 | Huda |

* cited by examiner

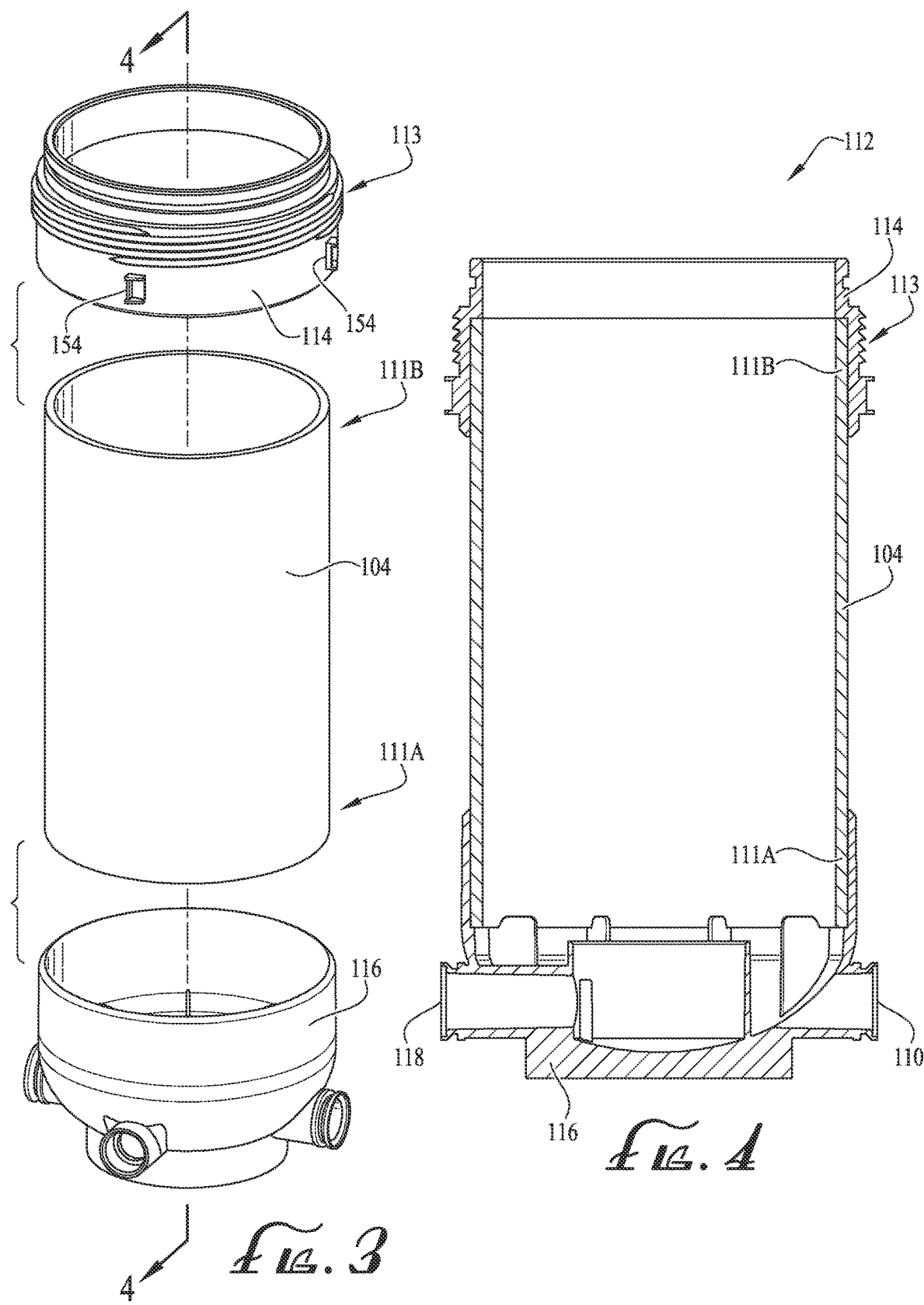

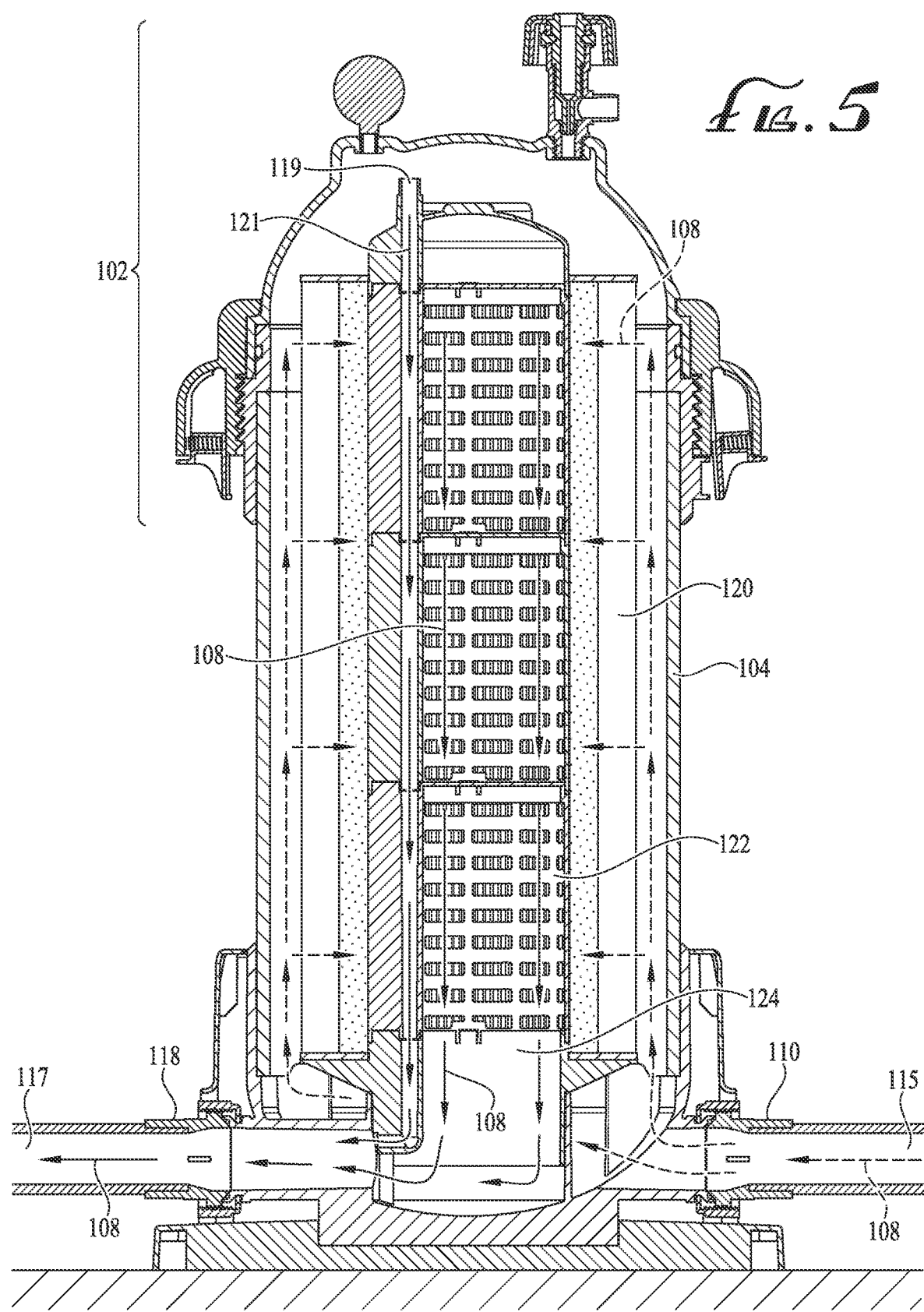

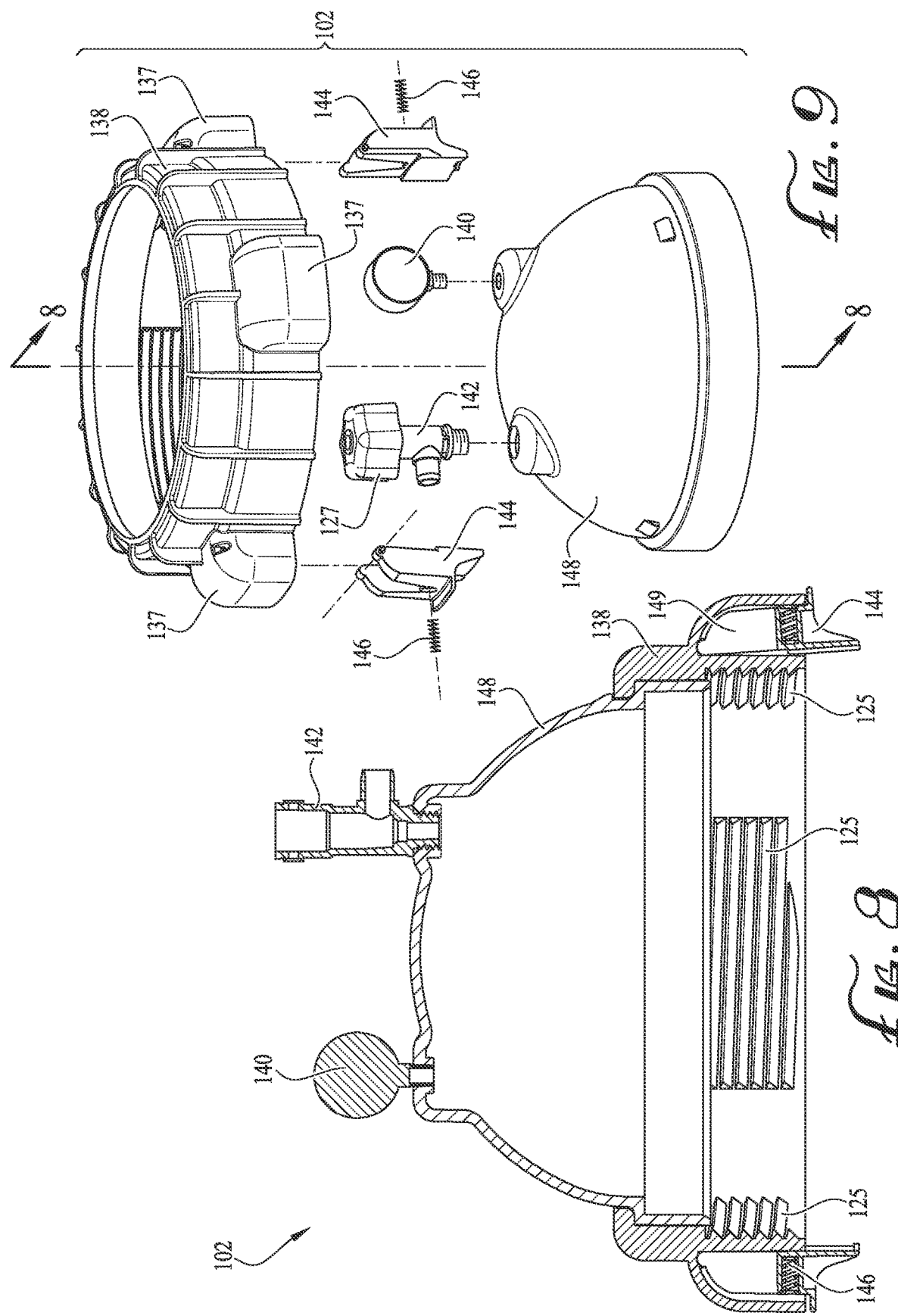

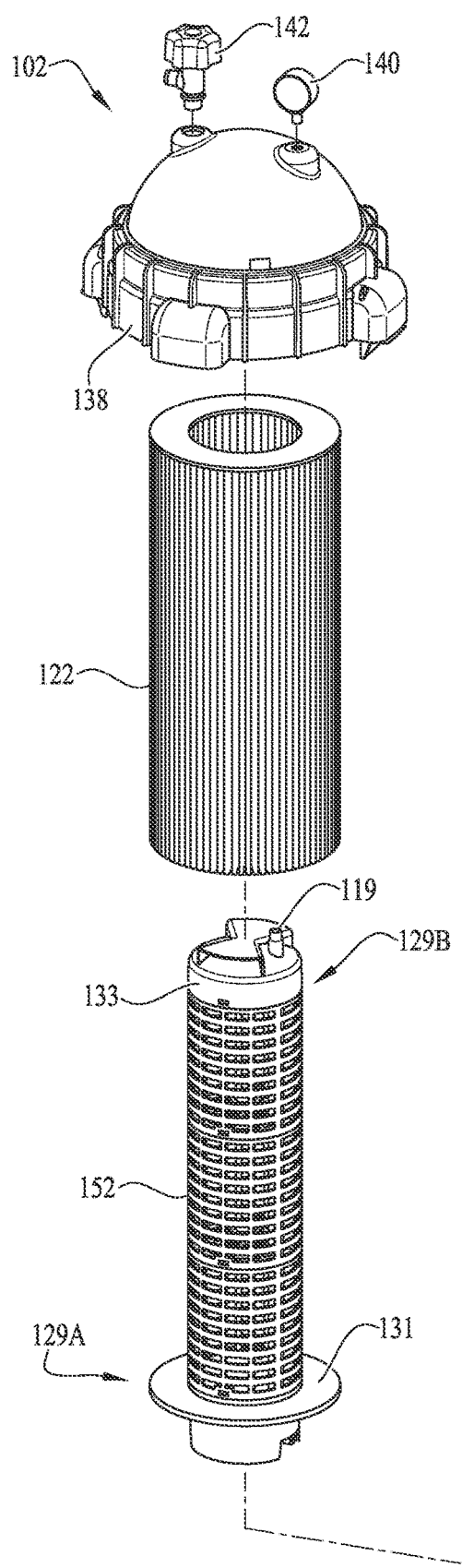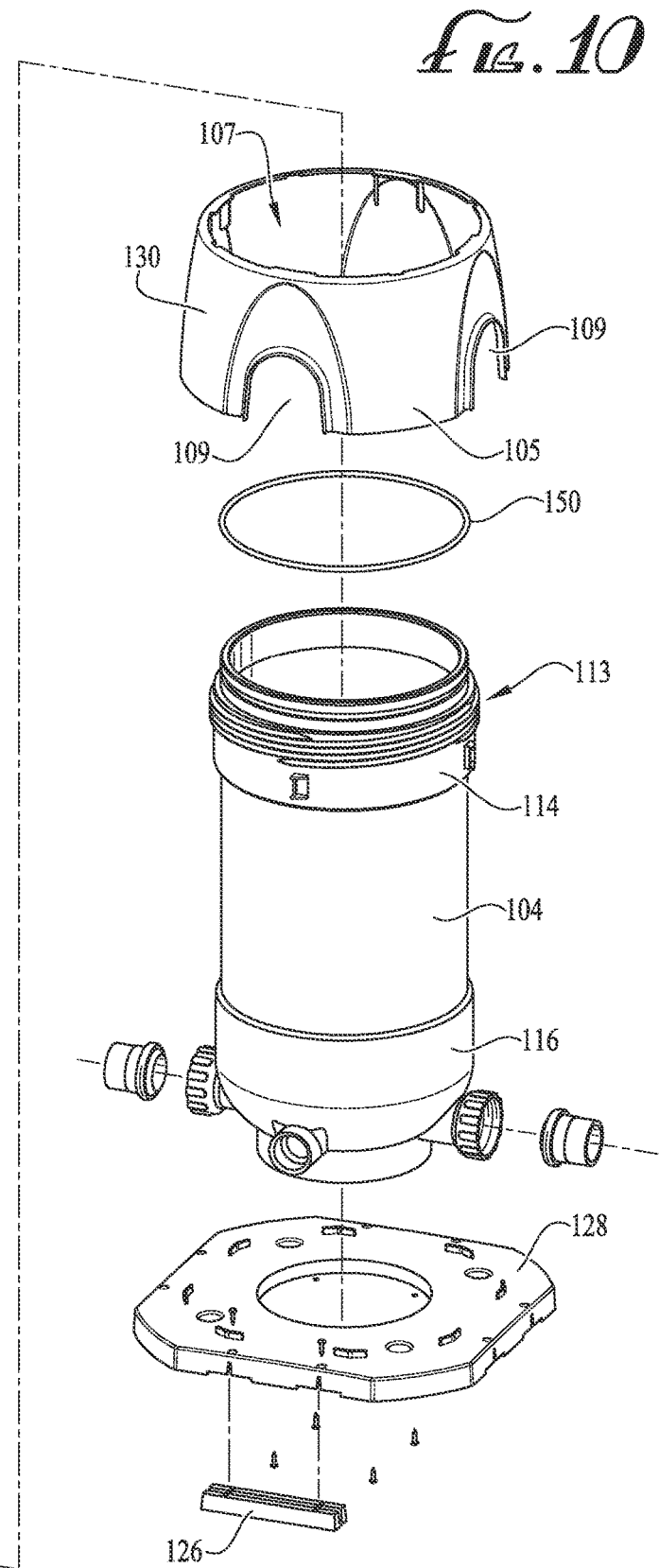
fig.10

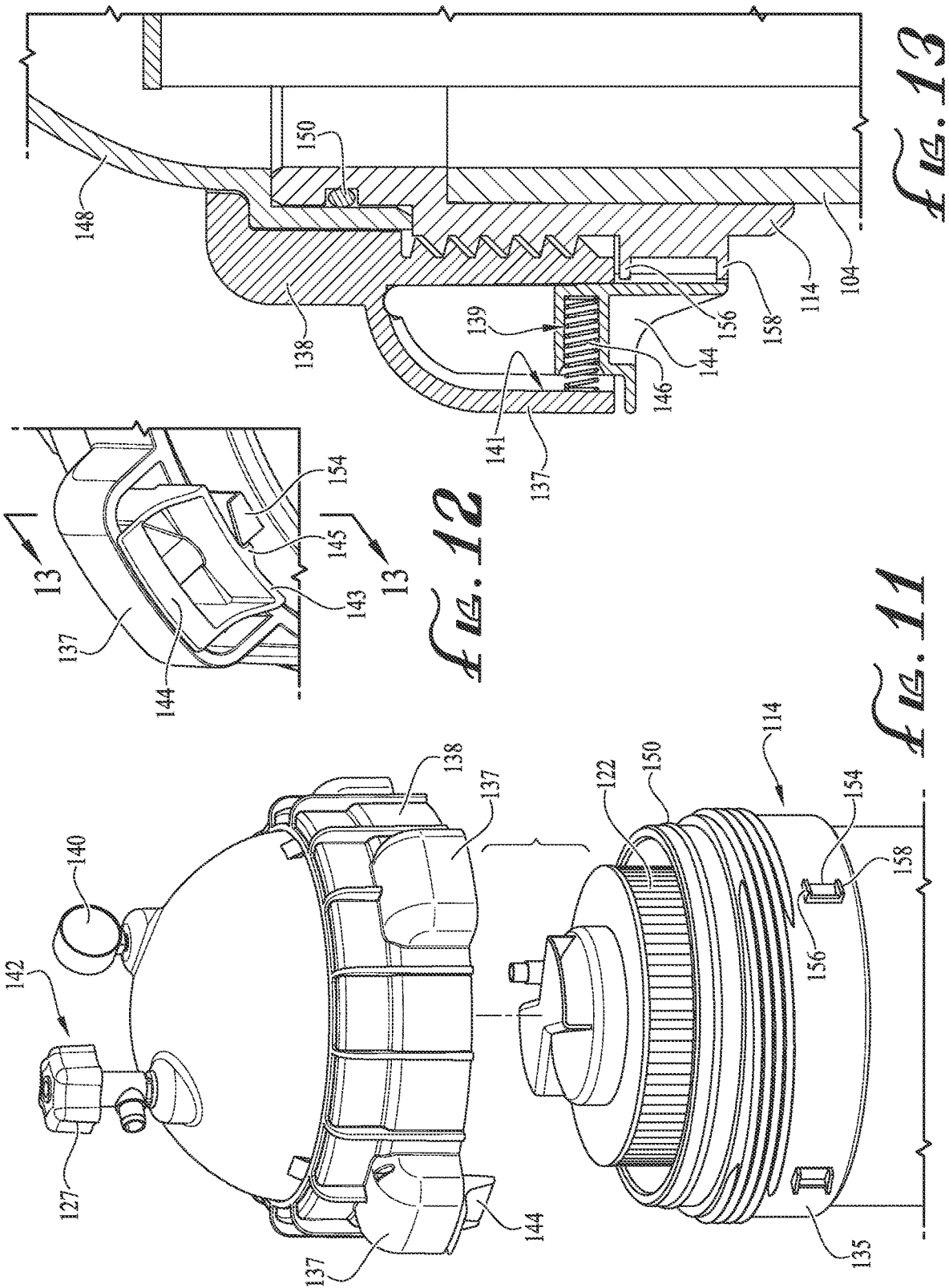

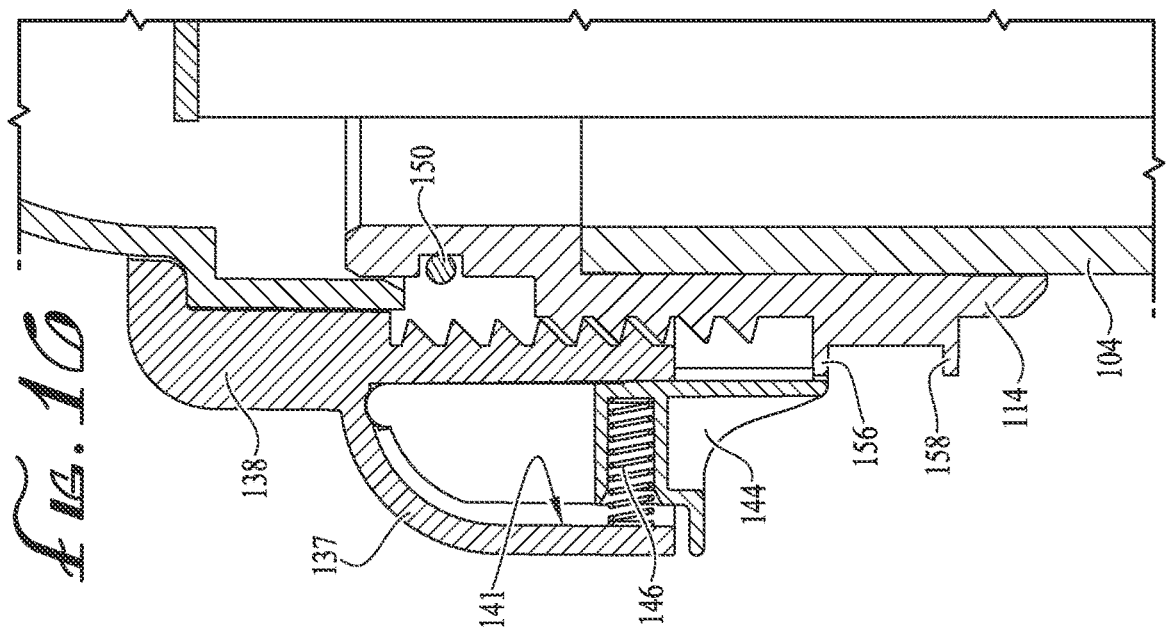
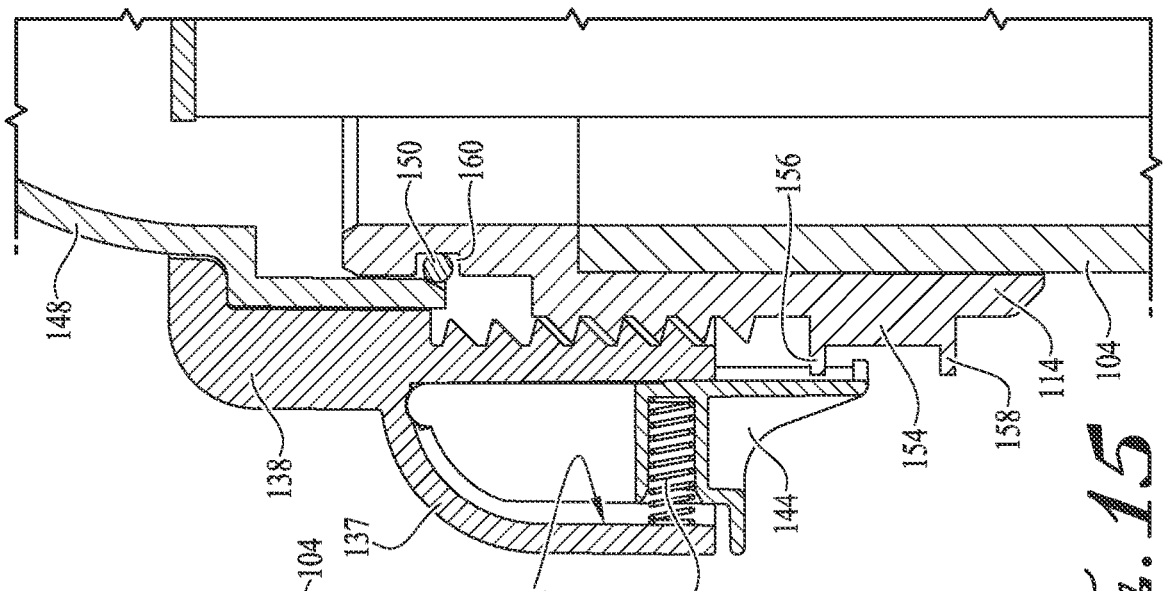
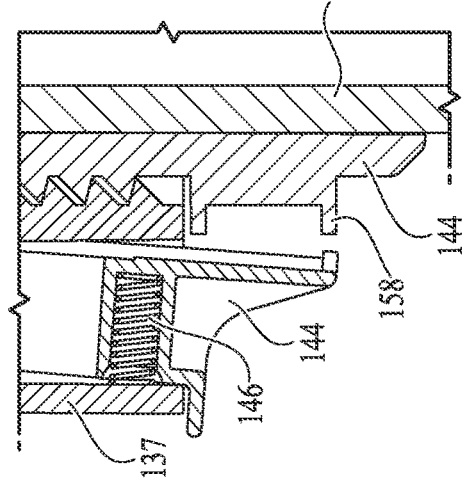

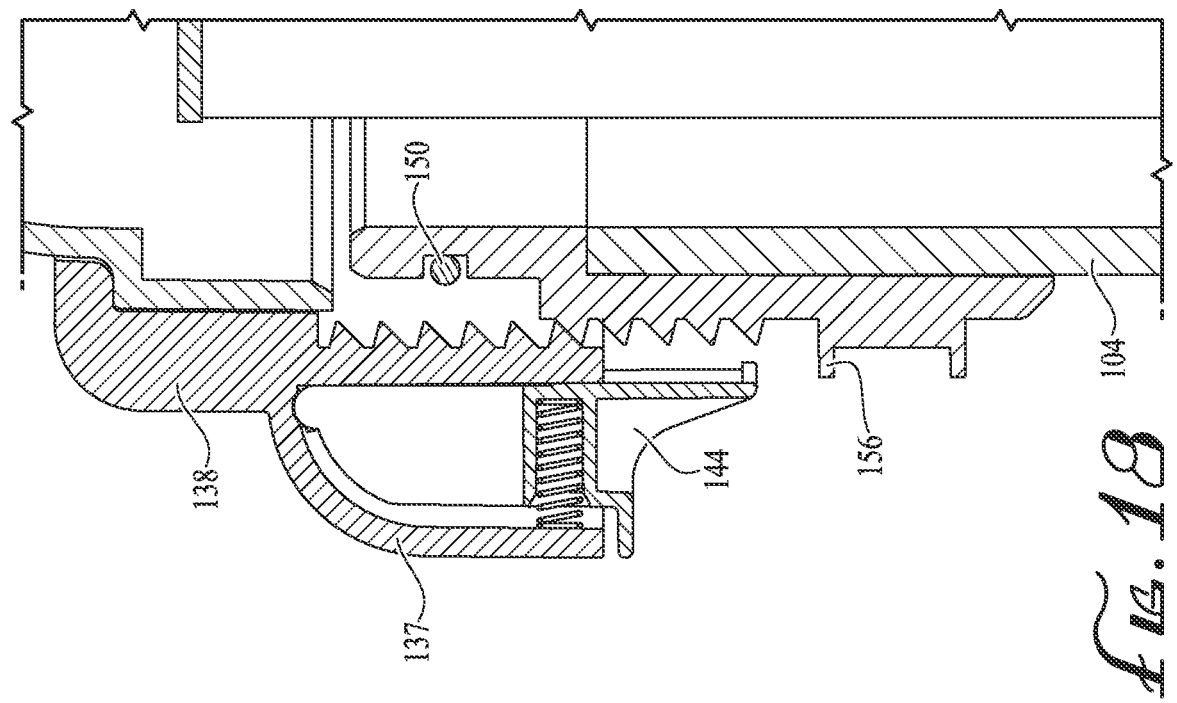
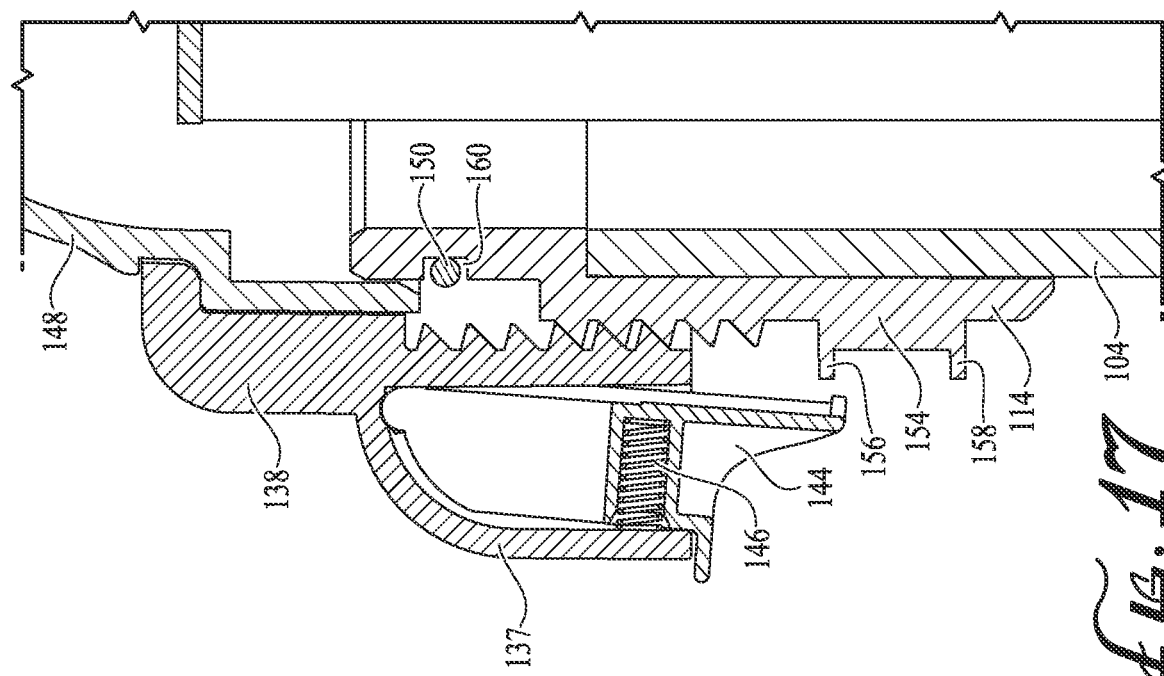

PIPELINE FILTER

CROSS-REFERENCE TO RELATED APPLICATIONS

This U.S. Non-Provisional Patent Application is a continuation application of U.S. Non-Provisional patent application Ser. No. 17/154,527, entitled "Pipeline Filter," filed Jan. 21, 2021, which is a continuation application of U.S. Non-Provisional patent application Ser. No. 17/007,595, entitled "Pipeline Filter," filed Aug. 31, 2020, which is a continuation application of U.S. Non-Provisional patent application Ser. No. 16/864,382, now U.S. Pat. No. 10,792,596, entitled "Pipeline Filter." filed May 1, 2020, and claims the benefit of U.S. Provisional Patent Application Ser. No. 62/854,856 entitled "Pipeline Filters" filed May 30, 2019, which applications are incorporated in their entirety herein by this reference.

BACKGROUND

Pool filters are an essential requirement for any pool system. These filters tend to come in three varieties, sand, cartridge, and diatomaceous earth. The costs associated with these three filtering methods depends on the filter type, with sand being the lowest price filter and diatomaceous earth being the most expensive. Because cartridge filters tend to provide a good balance between cost and efficiency, these pool filters are in great demand. Cartridge filters tend to operate more favorably when scaled to a larger size. Specifically, to provide more adequate filtering, a larger amount of surface area of the cartridge should be exposed to the water. But, routine maintenance is often missed because removing the lid from the filter is cumbersome and difficult. Commonly the filter's lid needs to be pried off, which makes changing and or cleaning the filter a burdensome task.

Unfortunately, the large size of the filter means that the housings used to support these filters tend to be costly to build. The result of using a large filter means all the associated components which support that filter need to be large as well. This poses problems for the industry. To start with, the filters require housings that is adequately sized to match the needs of the filter. To make housings of such size, manufacturers require production molds which are even larger and more costly to manufacture. This, in turn, requires even larger and more costly molding machine to manufacture production molds to produce the housings. The cost of producing such large pool filter housings balloons, even more, when considering the added total volume of raw materials needed to manufacture the necessary components at each stage of the production process.

As expected, the average costs of pool filters and the associated filter housing has steadily climbed as a function of filter size. The typical cost to install a pool filter system is approximately $1,500, and can dramatically increase with larger pools. It is not uncommon to find whole structures on a property used only to shelter this unnecessarily large and expensive pool filter equipment, and as mentioned, in addition to problems posed with larger pool filters, the access to the internal filters is unnecessarily difficult for the average pool owner. No manufacturer has yet come up with an innovative way to remove the filters lids for easy maintenance. Each filter on the market requires pulling and prodding to remove the lid.

What is needed is a pool filter design which would do away with the need for oversized molds and oversized molding machines. Such housing should also be easier for the end consumer to maintain and cheaper for the manufacturer to purchase.

SUMMARY

In the invention described herein is directed to a pipeline filter assembly having a base assembly, an outer wall, and a lid assembly.

In a first embodiment, the outer wall has a lower end portion and an upper end portion, wherein the upper end portion has a lower collar, the lower collar having at least one lock notch spaced around an exterior surface thereof.

The lid assembly is configured to couple to the lower collar of the outer wall and has an upper collar configured to threadedly mate with the lower collar.

The lid assembly can include an upper cover configured to secure to the outer wall via the threaded mating of the lower collar and the upper collar.

Optionally, the upper cover has a top surface and comprises at least one pressure gauge coupled to the top surface of the upper cover and at least one pressure relief valve threadedly coupled to the top surface of the upper cover.

The upper collar has at least one housing that projects from the upper collar, the housing having an interior surface, and at least one biasing clip pivotally mounted within the housing for releasable engagement with the lock notch.

The base assembly can comprise a filter base, a base plate upon which the pipeline filter assembly is configured to rest, and a support collar configured to couple to the base plate. The support collar can have a circular top opening and at least two side openings.

The filter base can have at least one inlet port for water to enter the pipeline filter assembly and at least one outlet port for water to exit the pipeline filter assembly.

Optionally, the lower end portion of the outer wall is seated within the base assembly.

The upper collar can further comprise at least one biasing spring wherein an end of the biasing spring abuts the interior surface of the housing and biases its corresponding biasing clip to a locked position around a corresponding lock notch. An end of the biasing spring can abut the interior surface of the housing and bias its corresponding biasing clip to a locked position around a corresponding lock notch.

The lower collar has at least one lock notch spaced around an exterior surface thereof. The lock notch has an upper portion and a lower portion.

Ideally, the pipeline filter assembly further comprises a filter support member and a filter for placement inside the pipeline filter assembly.

Ideally, the filter base has at least one inlet port for water to enter the pipeline filter assembly and at least one outlet port for water to exit the pipeline filter assembly.

Ideally, the support collar comprises a top opening and at least two side openings.

Ideally, the lock notch comprises an upper portion and a lower portion.

Ideally, the biasing spring is mounted within a recess disposed within the biasing clip.

Ideally, the biasing clip is in a primary locked position when the biasing clip is engaged with the lower portion of the lock notch, and the biasing clip is a secondary locked position when the biasing clip is engaged with the upper portion of the lock notch.

Ideally, there are a plurality of lock notches.

Ideally, there are a plurality of biasing clips and biasing springs.

In a second embodiment, the invention is directed to a method of disengaging the lid assembly from pipeline filter assembly. The method comprises the steps of:

a) pulling the biasing clip outwards, towards the inside surface of the housing to disengage the biasing clip from the lower portion of the lock notch;

b) rotating the lid assembly until the biasing clip clears the lower portion of the lock notch;

c) releasing the biasing clip and continuing rotation of the lid assembly until the biasing clip engages the upper portion of the lock notch;

d) pulling the biasing clip outwards, towards the inside surface of the housing to disengage the biasing clip from the upper portion of the lock notch; and e) continuing rotation of the lid assembly until the lid assembly is completely disengaged from the lower collar.

In a third embodiment, the invention is directed to a pipeline filter system comprising a pair of pipeline filter assemblies and at least one connection plate.

Ideally, each base plate comprises at least one alignment slot and the connection plate has at least one joining member that corresponds to the at least one alignment slot in the base plates.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 3 is an exploded view of my pipeline filter housing;

FIG. 4 is a section view of a portion of my pipeline filter housing;

FIG. 5 is a section side view of showing water flow through my pipeline filter as a system;

FIG. 8 is a section view of my pipeline filter lid assembly;

FIG. 9 is a further exploded view of FIG. 8 illustrating my pipeline filter lid assembly;

FIG. 10 is an exploded view of my pipeline filter assembly further illustrating the internal components:

FIG. 11 is a diagrammatic view of my pipeline filter lid assembly illustrating the application of the lid to the housing body:

FIG. 12 is an enlarged view of a clip located on a lateral portion of my pipeline filter lid:

FIG. 13 is an enlarged view of a clip located on a lateral side of my pipeline filter lid further illustrating an engaged clip;

FIG. 14 is an enlarged section view of my pipeline filter lid illustrating initial disengagement of the filter lid:

FIG. 15 is an enlarged section view of my pipeline filter lid illustrating partial disengagement of the filter lid;

FIG. 16 is an enlarged section view of my pipeline filter lid illustrating secondary engagement of the clip of the filter lid:

FIG. 17 is an enlarged section view of my pipeline filter lid illustrating secondary partial disengagement of the filter lid; and FIG. 18 is an enlarged section view of my pipeline filter lid illustrating a fully disengaged filter lid.

DETAILED DESCRIPTION

Figure 1:
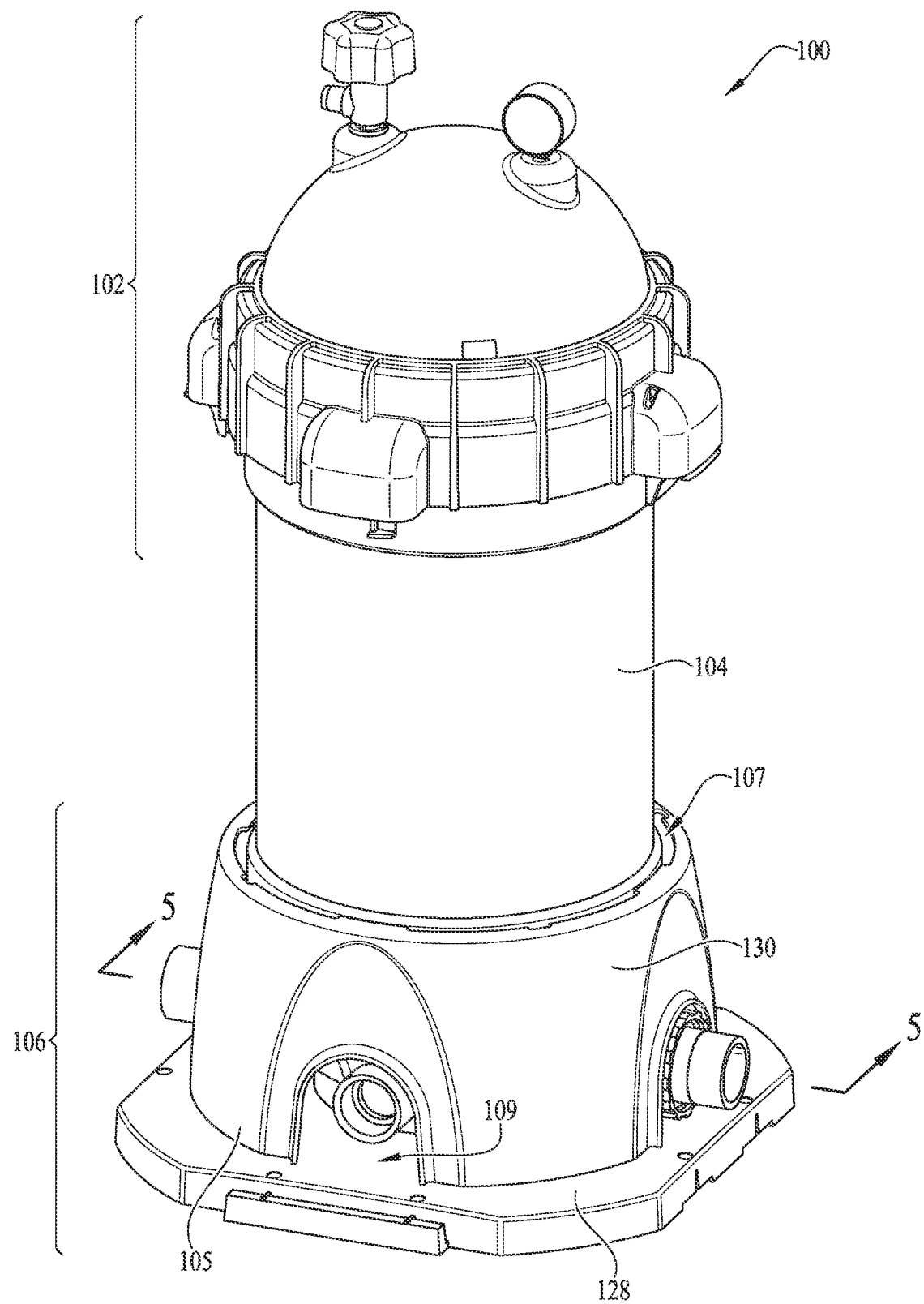
FIG. 1 is a perspective view of my pipeline filter housing.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to the drawings, like reference numerals designate identical or corresponding features throughout the several views. Further, described herein are certain non-limiting embodiments of my pipeline filter assembly for pool filtering and maintenance.

Referring to FIG. 1, there is shown one embodiment of my pipeline filter 100. Important components of my pipeline filter 100 shown in FIG. 1 include a lid assembly 102, an outer wall 104, and a base assembly 106. The lid assembly 102 and the base assembly 106 may be assembled from subparts later described. The outer wall 104 may be constructed from any plastic suitable for such uses and known in the industry, for example, schedule 40 twelve inch pipe or similar plastic product.

Base assembly 106 further comprises base plate 128 and support collar 130. Base plate 128 is the platform on which the filter assembly 100 rests. Support collar 130 is configured to received and retain base assembly 116, providing vertical support for the filter assembly 100.

Support collar 130 comprises a base portion 105 coupled to base plate 128 and a top opening 107 through which the outer wall 104 projects. The top opening 107 can be any shape, but is typically roughly circular to match the circumference of the outer wall 104. The base portion 105 of support collar 130 further comprises at least two side openings 109, preferably three side openings 109, through which the base assembly 106 can be connected to water pipes. Support collar 130 may be connected to base plate 128 by clips, screws, or other connection method known in the industry. Further, support collar 130 and base plate 128 may be molded to form one contiguous member.

Figure 2:
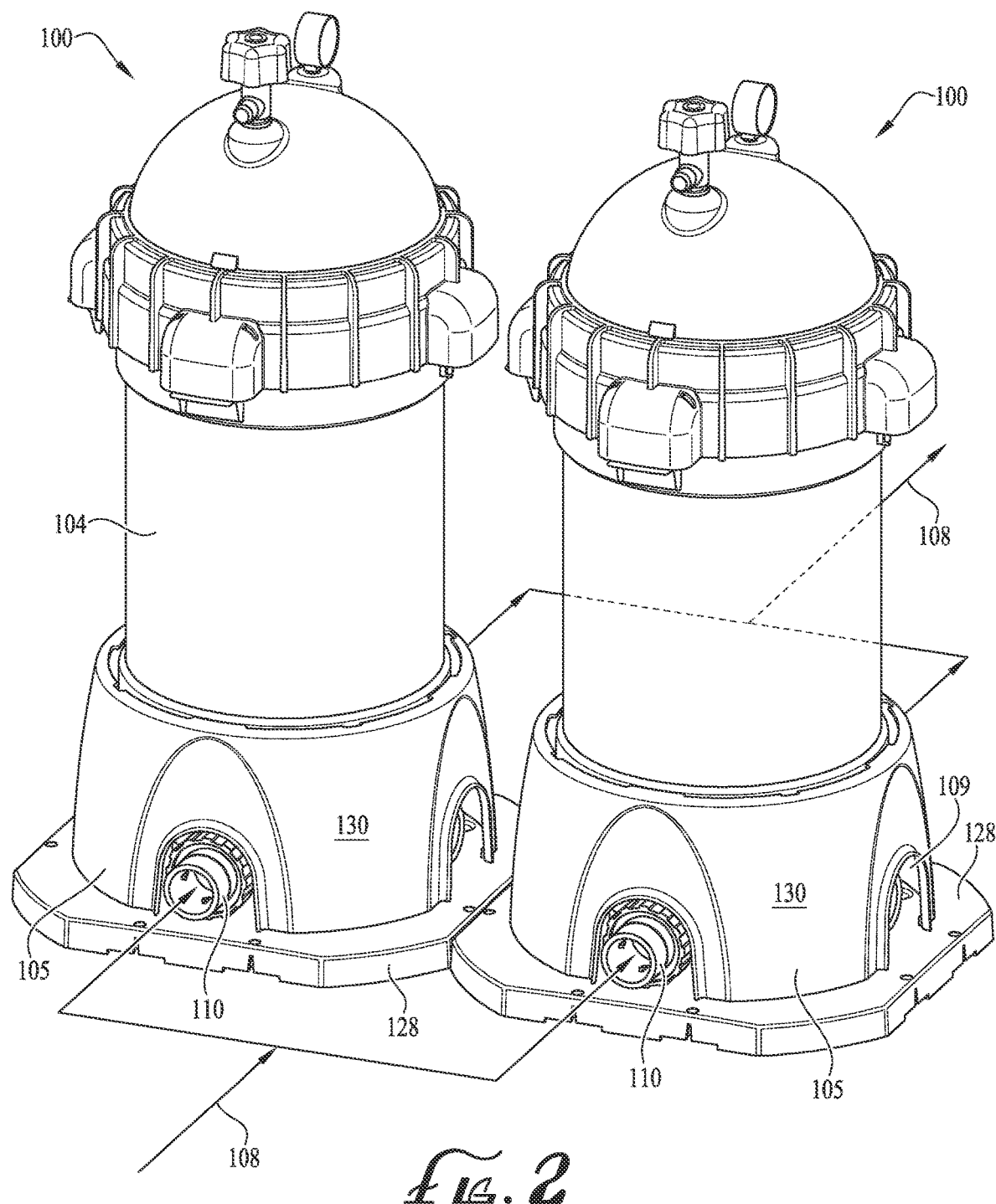
FIG. 2 is a perspective view of a pair of my pipeline filter housings further illustrating directional water flow.

Shown in FIG. 2 is a pair of my pipeline filter assemblies 100. Said pair 100 is arranged in a configuration which may better illustrate a water flow direction 108. Water needing to be filtered from the pool may travel to pipeline filter assembly 100 and travel in flow direction 108 into an inlet port 110. The water may then travel through a body of the pipeline filter assemblies 100 as shown in FIG. 5. The directional arrows indicated on the far side of the flow direction 108 diagram may constitute filtered water flow ready for return to the pool. Water pipe which is standard in the industry may be used to feed water flow direction 108 to and from the pool.

Referring now to FIGS. 3 and 4, in FIG. 3, relevant parts of the filter housing subassembly 112 are shown, including an outer wall 104, a lower collar 114, and a filter base 116. The outer wall 104 has two opposed ends: a lower end portion 111A and an upper end portion 111B. The lower end portion 111A is seated within the filter base 116. The upper end portion 111B is seated within the lower collar 114. The lower collar 114 and the filter base 116 may be glued onto the outer wall 104 with adhesives commonly used in the industry, for example with PCV glue. This may create a watertight seal between the lower collar 114 and filter base 116 with outer wall 104.

FIG. 4 shows my filter housing subassembly 112 in an assembled configuration. As shown, the lower collar 114 may further have threading around/integrally formed within an outer surface 113, such that additional filter members may be tightened onto the lower collar 114.

The filter base 116 has an inlet port 110 and outlet port 118 for water to flow therethrough. Optionally, the filter base 116 may have a plurality of inlet ports 110 and a plurality of outlet ports 118. Additionally, the filter base 116 may have an internal structure which serves to divert water flow direction 108 into the filtering area later described in FIG. 5. The lower collar 114 and the filter base 116 may be injection molded and made from any plastic commonly known in the industry, for example, PVC. The at least two side openings 109, preferably three side openings 109, of the support collar 130 are the openings through which the plurality of inlet ports 110 and outlet ports 118 of the base assembly 106 can be connected to water pipes.

FIG. 5 shows flow direction 108 as water enters my pipeline filter assembly 100 at the inlet port 110 via a water inlet tube 115. From there, the flow direction 108 is diverted into an external chamber 120 which fully surrounds the filter 122. The external chamber 120 tends to occupy a substantial height of my pipeline filter assembly 100 and may be substantially the same height as filter 122. The water flow direction 108 then passes through filter 122 and into internal chamber 124. The water internal to internal chamber 124 is considered filtered at this stage and is ready to be diverted back to the pool. The water flow direction 108 then passes out of outlet port 118. Outlet port 118 is connected to any water pipe 117 commonly used in the industry for transporting water to and from a pool.

Air suction line 119 is also shown in FIG. 5, and the direction of the air flow is shown via arrow 121. Air suction line 119 extends above the water level within the filter assembly 100, and draws air as necessary down into the outlet port 118 to remove air pressure from the filter assembly 100.

Figure 7:
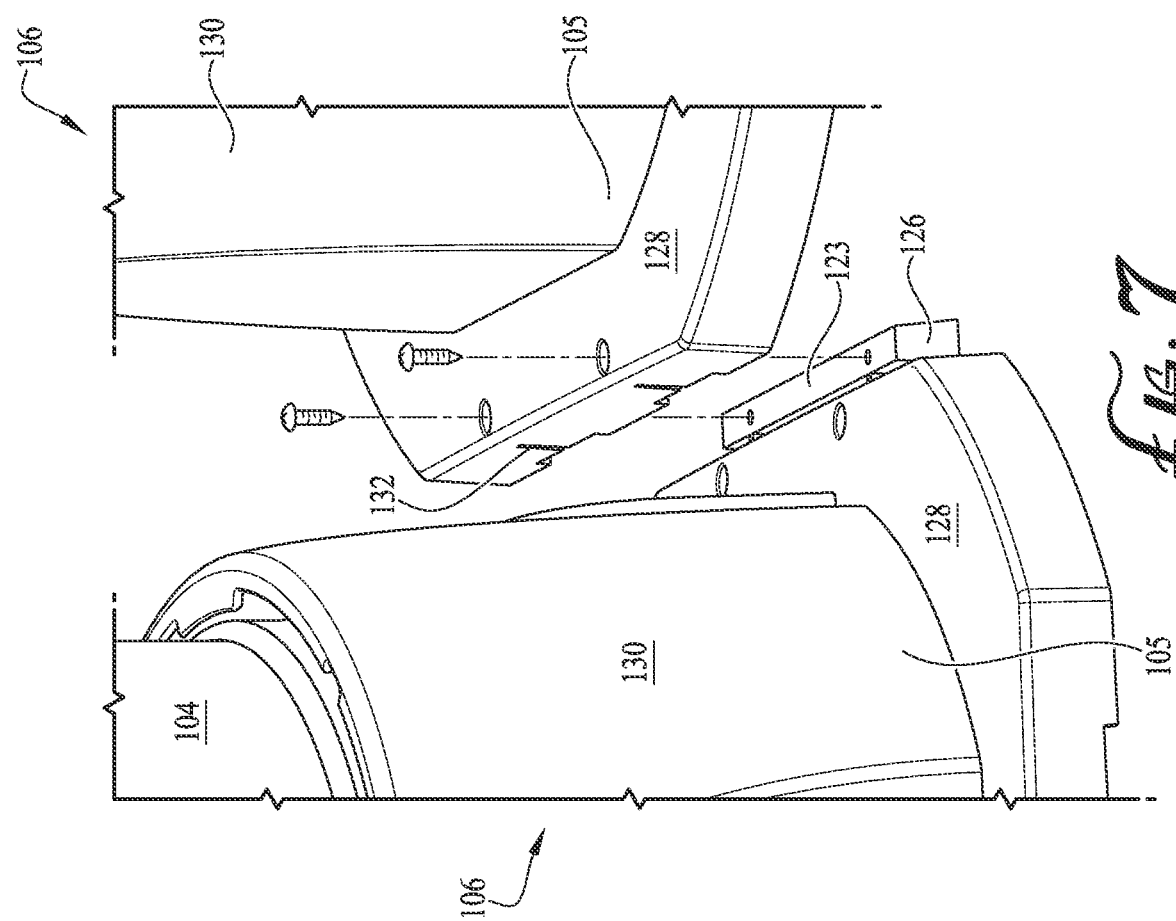
FIG. 7 is an additional perspective view of mounting my pipeline filter to an adjacent pipeline filter.
Figure 6:
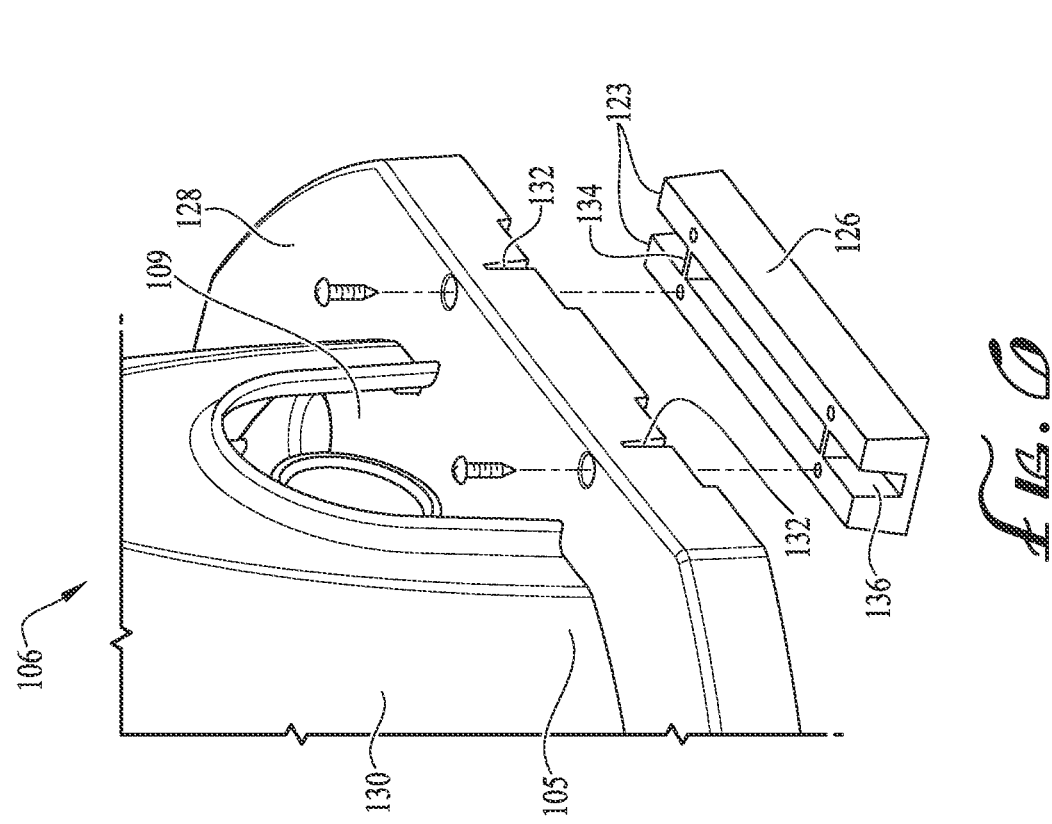
FIG. 6 is an exploded view of the mounting assembly for mounting my pipeline filter to an adjacent pipeline filter.

Referring now to both FIG. 6 and FIG. 7. FIG. 6 shows how two of my pipeline filter assemblies 100 may be used in parallel by use of connection plate 126. Base assembly 106 may be attached to connection plate 126 by way of screws, pegs, clips, or other reversible connection methods knows in the industry. Connection plate 126 is roughly rectangular in shape with two outer walls 123 that extend approximately the full length of the connection plate 126, forming a central channel 136 that extends roughly the entire length of the connection plate 126. Between the two outer walls 123 there is at least one joining member 134, preferably two joining members 134, that spans the central channel 136, dividing the central channel 136 into three separate channels.

Base plate 128 may have alignment slots 132 which correspond with the joining members 134 located on connection plate 126. The slots 132 and joining members 134 function as alignment aids to assure that the filter assemblies 100 are held in close proximity and roughly equidistant from other objects. Preferably, the central channel 136 of the connection plate 126 is wide enough to hold an edge of two base plates 128 further aiding in assuring non-movement and proper alignment of multiple assemblies 100.

Referring now to both FIG. 8 and FIG. 9, there is shown an upper collar 138, pressure gauge 140, pressure relief valve 142, biasing clip 144, biasing spring 146, and upper cover 148. As noted above, the outer wall 104 has the lower collar 114 coupled an end portion thereof, wherein the lower collar 114 comprises threading along an exterior surface 113 thereof. The upper collar 138 also has threading 125 disposed internal to the collar 138 to threadably mate with the lower collar 114. As the upper collar 138 is disposed over and around the upper cover 148, the mating of the upper collar 138 and the lower collar 114 removably couples the upper cover 148 the outer wall 104, forming a removable top of the filter assembly 100. The upper collar 138 may be injection molded with plastics commonly known in the industry and may be further filled with glass. The upper cover 148 may be made from glass, borosilicate glass, or other glass or plastic known in the industry.

Threadably coupled to a top surface of the upper cover 148 is the pressure relief valve 142. Optionally, the pressure relief valve 142 can be coupled via glue to the upper cover 148. The pressure relief valve 142 comprises a rotatable handle 127 that is used to purge air from the filter assembly 100 at start up by opening and closing the valve 142. The pressure gauge 140 provides a reading of pressure within the filter assembly 100. The biasing clip 144 and biasing spring 146 are discussed in more detail below.

FIG. 10 shows my entire pipeline filter assembly 100 with most or all of the constituent parts. Not previously noted is O-ring 150 and filter support member 152. O-ring 150 provides a watertight reversible seal between upper collar 138 and lower collar 114. Filter support member 152 aids in maintaining the structural integrity and shape of filter 122. Filter support member 152 comprises a cylindrical body with an open bottom end portion 129A and an open top end portion 129B. A circular flange 131 extends from radially from the open bottom end portion 129A, providing a surface upon which the filter 122 rests when placed over the filter support member 152. A cap 133 is coupled to the open top end 129B and comprises a tubular projection 119 that extends upward, away from the cap 133. This is the air suction line 119 noted above. Filter support member 152 is made from plastics commonly known in the industry.

FIG. 11 through FIG. 18 illustrate the manner in which an end user of my pipeline filter assembly 100 may engage and disengage the lid assembly 102 from the remainder of pipeline assembly 100. FIG. 11 shows the lower collar 114 coupled to an open end of the outer wall 104. The top of the filter 122 projects above the open end of the lower collar 114. There is at least one, but more preferably, there is a plurality of lock notches 154 spaced around an exterior surface 135 of the lower collar 114. The lock notches 154 project outward from the exterior surface 135 of the lower collar 114 and engage with biasing clips 144 in a releasable manner. The lock notches 154 have an upper portion 156 and a lower portion 158 which may further correspond to points of engagement with a corresponding biasing clip 144. The lock notches 154 may be contiguous with lower collar 114 along with their upper portion 156 and lower portion 158.

As noted above, each biasing clip 144 further comprises a biasing spring 146. Each biasing clip 144 is pivotally mounted within a housing 137 that projects from the upper collar 138 and each biasing spring 146 is mounted within a recess 139 disposed within the biasing clip 144. The biasing spring 146 projects from the recess 139 in the biasing clip 144 and abuts an interior surface 141 of the housing 137. Optionally, the housing 137 can function as a handle for gripping by the end user and is preferably rounded in shape to make it comfortable for the end user to grip.

Each biasing spring 146 biases its corresponding biasing clip 144 to a locked position around a corresponding lock notch 154. Depression of the biasing clip 144 (by pulling the biasing clip 144 outward, away from the lower collar 114 and toward the interior surface 141 of the corresponding housing 137) such that biasing spring 146 is depressed, allows an end user to rotate the lid assembly 102 and threadedly disengage the lid assembly from the remainder of pipeline assembly 100.

As noted above, the lock notches 154 each comprise an upper portion 156 and a lower portion 158. Engagement of the biasing clip 144 with lower portion 158 of the lock notch 154 creates the primary locked position. Engagement of the biasing clip 144 with upper portion 156 of the lock notch 154 creates the secondary locked position.

The primary locked position is best seen in FIGS. 12 and 13 and is discussed first. The first point of disengagement occurs when biasing clip 144 is between upper portion 156 and lower portion 158 of corresponding lock notch 154. In order to reach the first point of disengagement, the biasing clip 144 must be disengaged from the primary locked position.

FIG. 12 shows an enlarged view of the biasing clip 144 engaged in the primary locked position with a lower portion 158 of lock notch 154. A bottom portion 143 of the biasing clip 144 comprises a projection 145 that helps the biasing clip 144 to engage with the lock notch 154 and prevent rotation of the lid assembly 102. Five threads of both the lower collar 114 and the upper collar 138 are fully engaged with each other and O-ring 150 is fully compressed.

FIG. 13 is a sectional view of FIG. 12. The lower portion 156 of lock notch 154 is engaged with biasing clip 144. Biasing spring 146 is not compressed and is maintaining expansion pressure between the inside surface 141 of the housing 137 and the biasing clip 144. The expansion pressure of biasing spring 146 keeps biasing clip 144 in the primary locked position until a user intentionally disengages the biasing clip 144.

FIG. 13 also shows the threaded engagement of the lid assembly 102 with the lower collar 114 which induces the compression of O-ring 150. O-ring 150 sits in annular groove 160 of the lower collar 114. Compressing O-ring 150 further aids in maintaining a watertight seal between lower collar 114 and upper collar 138. This compression occurs between upper cover 148 and lower collar 114 and is resultant by threadedly engaging the two collars together and is locked into place by biasing clip 144 and biasing spring 146.

FIG. 14 shows an initial disengagement of biasing clip 144 from lower portion 158 of lock notch 154 (primary locked position). As noted above, said disengagement from the primary locked position occurs by pivoting biasing clip 144 on one axis resulting in compression of biasing spring 146 and release of biasing clip 144 from the lower portion 158 of the lock notch 154. This pivoting can be achieved by pulling the biasing clip 144 outward, away from the lower collar 114, and towards the interior surface 141 of the housing 137. Once initial disengagement occurs, an end user may rotate lid assembly 102 about an axis to further disengage the lid assembly 102.

FIGS. 15 through 18 illustrate gradual threaded disengagement of lid assembly 102 from lower collar 114. Of particular note, FIG. 16 illustrates the upper portion 156 of lock notch 154 in the secondary locked position. This secondary locked position prevents accidental disengagement of the lid assembly 102 from lower collar 114 as the lid assembly 102 cannot fully disengage from the lower collar 114 until the biasing clip 144 is released for a second time from lock notch 154. O-ring 150 is no longer compressed by the upper cover 148 and water pressure has been released.

FIG. 17 illustrates a similar action as shown in FIG. 14 wherein disengagement from the secondary locked position occurs by pivoting biasing clip 144 on one axis resulting in compression of biasing spring 146 and release of biasing clip 144 from upper portion 156 of lock notch 154 (secondary locked position).

FIG. 18 shows complete disengagement of lid assembly 102 from lower collar 114 wherein the lid assembly 102 can be removed and further allowing access to internal chambers of the filter assembly 100 and the filter 122 contained therein.

Having disclosed the structure of the preferred embodiments, it is now possible to describe their function, application, and use. Pipeline filter assembly 100 may be constructed from subparts made by injection mold. Specifically, the lower collar 114, the upper collar 138, and base assembly 106 may all be injection molded. The injection mold process may use a variety of plastics known in the industry, for example, PVC. Subsequent to molding said subparts, the subparts may then be glued to a standard pipe sufficient for pool filtering uses, for example, schedule 40 PVC pipe or other types of pipe. Construction by injection mold of smaller subparts means that overly large injection molds are not required, and thus savings may be had during construction and then passed to end consumers.

Importantly, an end user of the pipeline filter assembly 100 may engage and disengage the lid assembly 102 with ease via the self-threading O-ring 150 and lock notch 154. The lock notch 154 may engage with biasing clip 144 in a releasable manner. The biasing spring 146 may bias a biasing clip 144 to a primary and secondary locked position around a lock notch 154. Depression of a biasing clip 144, such that biasing spring 146 is depressed, allows an end user to rotate a lid assembly 102 and threadedly disengage the lid assembly from the remainder of pipeline assembly 100. The first point of disengagement, or primary locked position, occurs when biasing clip 144 is between upper portion 156 and lower portion 158 of a lock notch 154.

Specific to the threaded engagement of the lid assembly 102 with the lower collar 114 is the compression of O-ring 150. O-ring 150 sits in annular groove 160 of the lower collar 114. Compressing O-ring 150 further into annular groove 160 aids in maintaining a watertight seal between lower collar 114 and upper collar 138. This compression occurs between upper cover 148 and lower collar 114 and is resultant by threadably engaging the two collars together and is locked into place by biasing clip 144 and biasing spring 146.

As noted above, there may be a primary disengagement of biasing clip 144 from lower portion 158 of lock notch 154 and a secondary disengagement of biasing clip 144 from upper portion 158 of lock notch 154. Said disengagement occurs by rotating biasing clip 144 on one axis resulting in compression of biasing spring 146 and release of biasing clip 144 from lower portion 158 of lock notch 154 and again from upper portion 156 of lock notch 154.

Filter 122 may be accessed as noted above. Removal of filter 122 may occur by rotating the lid assembly 102 as previously described, and lifting the filter 122 vertically out of the pipeline filter assembly 100. Once isolated, filter 122 may be cleaned by methods commonly used in the industry. Return of the filter 122 to the pipeline filter assembly 100 may occur by the reverse of the above and return of the lid assembly 102 is likewise the reverse of the above described. Returning the biasing clip 146 to the primary locking position with respect to the lower portion 158 of lock notch 154 creates a watertight seal and places the pipeline filter assembly 100 back into a condition for use.

An end user would change the filter 122 as follows: first the

Particularly advantageous of the pipeline filter assembly 100 may be that a number of the parts produced by the injection molding process which may be smaller, which in turn necessitates smaller molds, which in turn necessitates a smaller molding machine. Such a pipeline filter assembly 100 design would be further innovative if filter lid assembly 102 possessed a self-engaging O-ring 150 mechanism which may be built into the housing itself. The present invention addresses these needs.

While particular forms of the invention have been illustrated and described, it will also be apparent to those skilled in the art that various modifications can be made without departing from the spirit and scope of the invention.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference.

What is claimed is:

1. A pipeline filter assembly comprising:
   a) a base assembly having:
      i) a filter base;
      ii) a base plate upon which the pipeline filter assembly is configured to rest;
   b) an outer wall having a lower end portion and an upper end portion, wherein the lower end portion is seated within the base assembly and the upper end portion comprises a lower collar seated thereon, the lower collar comprising at least one lock notch spaced around an exterior surface thereof; and
   c) a lid assembly configured to couple to the lower collar of the outer wall, the lid assembly having:
      i) an upper collar configured to threadedly mate with the lower collar, the upper collar having:
         1) at least one housing that projects from the upper collar, the housing having an interior surface;
         2) at least one biasing clip pivotally mounted within the housing for releasable engagement with the lock notch; and
         3) at least one biasing spring wherein an end of the biasing spring abuts the interior surface of the housing and biases its corresponding biasing clip to a locked position around a corresponding lock notch.

2. The pipeline filter assembly of claim 1, further comprising an upper cover configured to secure to the outer wall via mating of the lower collar and the upper collar, the upper cover having:
   a) a top surface;
   b) at least one pressure gauge coupled to the top surface of the upper cover; and
   c) at least one pressure relief valve coupled to the top surface of the upper cover.

3. The pipeline filter assembly of claim 1, wherein the lock notch has an upper portion and a lower portion.

4. The pipeline filter assembly of claim 3, wherein the biasing clip is in a primary locked position when the biasing clip is engaged with the lower portion of the lock notch, and the biasing clip is a secondary locked position when the biasing clip is engaged with the upper portion of the lock notch.

5. A method of disengaging the lid assembly from the pipeline filter assembly of claim 3, the method comprising the steps of:
   a) pulling the biasing clip outwards, towards the interior surface of the housing to disengage the biasing clip from the lower portion of the lock notch;
   b) rotating the lid assembly until the biasing clip clears the lower portion of the lock notch;
   c) releasing the biasing clip and continuing rotation of the lid assembly until the biasing clip engages the upper portion of the lock notch;
   d) pulling the biasing clip outwards, towards the interior surface of the housing to disengage the biasing clip from the upper portion of the lock notch; and
   e) continuing rotation of the lid assembly until the lid assembly is completely disengaged from the lower collar.

6. The pipeline filter assembly of claim 1, wherein the biasing spring is mounted within a recess disposed within the biasing clip.

7. A pipeline filter assembly comprising:
   a) a base assembly;
   b) an outer wall having a lower end portion and an upper end portion, wherein the upper end portion comprises a lower collar, the lower collar comprising at least one lock notch spaced around an exterior surface thereof; and
   c) a lid assembly configured to couple to the lower collar of the outer wall, the lid assembly having:
      a) an upper collar configured to threadedly mate with the lower collar, the upper collar having:
         i) at least one housing that projects from the upper collar, the housing having an interior surface;
         ii) at least one biasing clip pivotally mounted within the housing for releasable engagement with the lock notch; and
         iii) at least one biasing spring within the housing that radially biases its corresponding biasing clip toward a central axis of the upper collar and to a locked position around a corresponding lock notch.

8. The pipeline filter assembly of claim 7, wherein the base assembly comprises:
   i) a filter base;
   ii) a base plate upon which the pipeline filter assembly is configured to rest; and
   iii) a support collar configured to couple to the base plate.

9. The pipeline filter assembly of claim 7, further comprising an upper cover configured to secure to the outer wall via the mating of the lower collar and the upper collar.

10. The pipeline filter assembly of claim 7, further comprising a filter base that has at least one inlet port for water to enter the pipeline filter assembly and at least one outlet port for water to exit the pipeline filter assembly.

11. The pipeline filter assembly of claim 7, wherein there are a plurality of lock notches.

12. The pipeline filter assembly of claim 7, further comprising the biasing spring mounted within a recess disposed within the biasing clip.

13. The pipeline filter assembly of claim 7, where there are a plurality of biasing clips and biasing springs.

14. A pipeline filter system comprising:
  a) a pair of pipeline filter assemblies, each assembly having:
    i) a base assembly;
    ii) an outer wall having a lower end portion and an upper end portion, wherein the lower end portion is coupled to the base assembly and the upper end portion comprises a lower collar, the lower collar comprising at least one lock notch spaced around an exterior surface thereof; and
    iii) a lid assembly configured to couple to the lower collar of the outer wall, the lid assembly having:
      1) an upper collar configured to threadedly mate with the lower collar, the upper collar having:
        a) at least one housing that projects from the upper collar, the housing having an interior surface;
        b) at least one biasing clip pivotally mounted within the housing for releasable engagement with the lock notch; and
        c) at least one biasing spring wherein an end of the biasing spring abuts the interior surface of the housing and biases its corresponding biasing clip to a locked position around a corresponding lock notch; and
      2) an upper cover configured to secure to the outer wall via the mating of the lower collar and the upper collar; and
  b) at least one connection plate.

15. The pipeline filter system of claim 14, wherein each base assembly comprises a base plate having at least one alignment slot and the connection plate has at least one joining member that corresponds to the at least one alignment slot in the base plates.

\* \* \* \* \*